Figure 1:
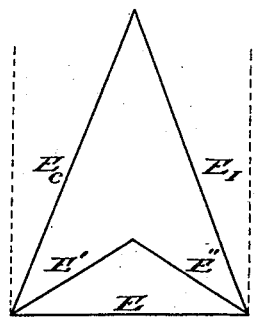

No. 710,355. Patented Sept. 30, 1902.
C. D. EHRET.
WIRELESS TELEGRAPH SYSTEM.
(Application filed May 29, 1902.)

(No Model.)

Witnesses

Inventor
Cornelius D. Ehret

UNITED STATES PATENT OFFICE.

CORNELIUS D. EHRET, OF ROSEMONT, PENNSYLVANIA, ASSIGNOR TO CONSOLIDATED WIRELESS TELEGRAPH AND TELEPHONE COMPANY, A CORPORATION OF ARIZONA TERRITORY.

WIRELESS-TELEGRAPH SYSTEM.

SPECIFICATION forming part of Letters Patent No. 710,355, dated September 30, 1902.

Original application filed December 3, 1901, Serial No. 84,514. Divided and this application filed May 29, 1902. Serial No. 109,424. (No model.)

*To all whom it may concern:*

Be it known that I, CORNELIUS D. EHRET, a citizen of the United States, residing at Rosemont, State of Pennsylvania, have invented certain new and useful Improvements in Wireless-Telegraph Systems, of which the following is a specification.

My invention comprises apparatus for transmitting intelligence from one station to another by means of electrical waves which are transmitted through the natural media.

It consists, further, in improvements in the circuits at the receiving-station of a wireless-telegraph system, and more particularly the location of the wave-detecting device for the purpose of making possible transmission of signals over greater distances.

It comprises, further, a proportionment of the receiving-conductor as to its electrical constants for the purpose of obtaining a maximum difference of potential at the terminals of the wave-detecting device.

It comprises, further, an improvement whereby greater difference of potential is obtained at the terminals of the wave-detecting device because of the resonance of the receiving-circuit.

The object of my invention is to obtain in the receiver-circuit a maximum difference of potential derived from the energy impinging upon the aerial conductor or arriving at the earth-plates of a wireless-telegraph system.

It is well known in the art of lighting or power transmission by means of alternate currents over metallic circuits that with a condenser and inductance inserted in such alternating circuit, if properly correlated or proportioned with respect to each other, a condition of either maximum current flow in both the inductance and condenser will be obtained or a maximum difference of potential will exist across the terminals of the inductance or condenser. A circuit so adjusted as to its capacity and inductance is termed a "resonant" circuit and is selective of a current of a particular frequency. By "resonant" circuit I wish to be understood the broad term, including both the series arrangement of condenser and inductance and the multiple or parallel arrangement of condenser and inductance. The first or series arrangement produces when in a resonant state a maximum rise of potential across the terminals of either the condenser or inductance and permits a flow through the circuit of a maximum current of the predetermined frequency. The second arrangement, or where the condenser and inductance are in parallel, causes at a critical proportioning of the two devices at a certain frequency a minimum flow of current through the circuit, but with maximum current through the local circuit, including the condenser or inductance.

In Figure 1, E represents graphically the electromotive force of an alternating circuit of a definite frequency. With certain proportions of the condenser and inductance in series with such circuit a rise of potential occurs across the terminals of both the condenser and inductance. These potentials are dephased with respect to the line voltage and with respect to each other and are graphically represented by E' across the condenser and E'' across the inductance. With still other proportions such differences of potential with the same impressed voltage E may become across the condenser $E^c$ and across the inductance $E^i$, and if the proportioning be further carried out the sides of the isosceles triangles shown become longer and longer, and for theoretical resonance become parallel lines, as indicated in the dotted portions of Fig. 1, in which case the voltage across condenser and inductance would be infinite. In this system the above-described principles are taken advantage of, and by causing the aerial receiving-circuit to be in resonance with the transmitted waves a maximum rise of potential is obtained across the terminals of the wave-detecting device.

Figure 2:
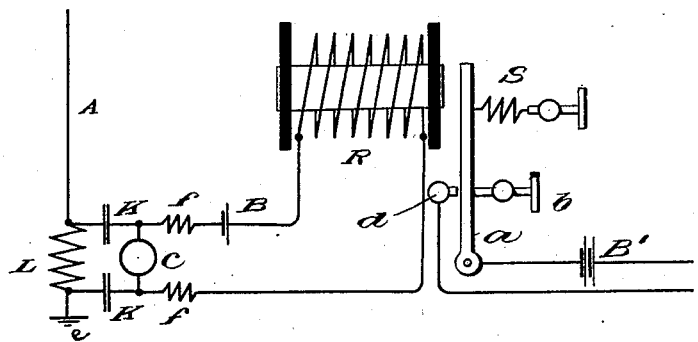

In Fig. 2, A is the aerial conductor of a wireless-telegraph station, such conductor consisting of a simple high-conductivity wire or a number of them in parallel or a metallic cylinder of large area, and for the purposes herein described such cylinder should be made telescopic for purposes of adjustment. In series between such conductor A and earth $e$ is an inductance L, which may be composed either of a coiled conductor or simply a suitable length of conductor or any other form of inductance device. The capacity and self-induction of such aerial circuit are such that the whole is resonant to the transmitted waves. If a wave-detecting device were inserted in series in said conductor, as is common, the difference of potential existing across its terminals, though the aerial conductor were resonant, would be quite small; but by arranging the wave-detector $c$, as shown, across the terminals of the inductance L it is subjected to a potential much in excess of the former arrangement, such potential corresponding to one on the legs $E^1$ of the triangle shown in Fig. 1. Connected to the terminals of the wave-detecting device $c$, which may be any well-known device—such as a coherer or anticoherer, but whose capacity is so small as not to disturb the resonance of the aerial circuit—is the local circuit, including the choke-coils $f$, source of energy B, and relay R. Associated with the relay R is the armature $a$, restrained by adjustable spring $s$ and held against the back-stop $b$. The attraction and release of such armature controls the local circuit through contact $d$, which includes the recording, tapping, and other devices energized by the source of energy B'.

Figure 3:
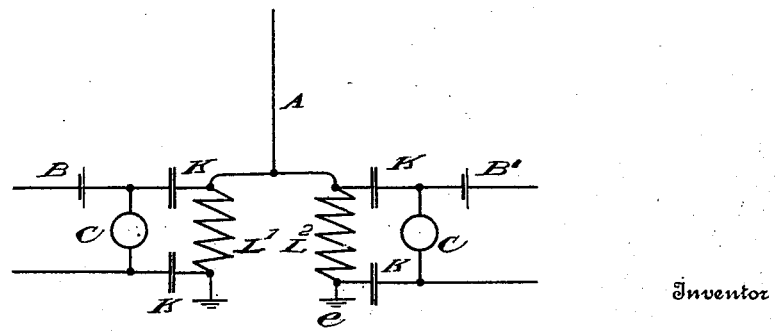

In Fig. 3 I have shown the aerial conductor A, whose circuit to earth is branched through the two inductances L' and L". These inductances are of different values, and each considered separately in connection with the capacity of the aerial conductor A makes its circuit from the aerial conductor A to earth resonant to a particular wave frequency. In other words, A and L' are resonant to a certain frequency and L" and A are resonant to a different frequency, so that there may be simultaneously received upon A waves of two different frequencies. In shunt to each of these inductances is shown the wave-detecting device with its associated local circuit, as described in previous figures. These separate resonant circuits may be used conjointly to produce a single record or may be used separately to receive two different messages at the same time.

In practice choke-coils are connected between the wave-responsive devices and their local circuits, as shown in Fig. 2.

In the figures are shown condensers $k$, whose purpose is to keep the battery-current from at all times circulating through the relay, which if permitted would make the loss of resistance of the coherer or gain of resistance in case of an anticoherer ineffective. The capacities of these condensers are very small and have practically no effect upon the resonance adjustment of the remaining circuits. One condenser alone may often be used; but I prefer using two for the purpose of symmetry.

I have shown in this application a receiver which employs an aerial conductor. It is to be understood, however, that my system can be used in connection also with receivers employing no ground-plate whatever or those employing two ground-plates and also those systems in which more than one aerial conductor is used either at certain distances apart with relation to the wave length transmitted or where they are not arranged with reference to the wave length. Though the aerial conductor and the inductance connected to earth does not form a complete electrical circuit it is commonly styled in this art the "aerial circuit." Furthermore, the resonance of a circuit depends among other things upon the inductance and capacity included in it and each is to be considered an element of the resonant circuit. It is to be understood also that the herein-described system of obtaining maximum effects in a receiver may be applied also to the transmission of signals over metallic circuits as well as in systems where the transmission occurs through the natural media.

In place of coherers or anticoherers may be used any other devices, whether operating upon the trigger principle in simply controlling a circuit or actually indicating or producing a signal itself.

I do not wish to be limited to the precise arrangement of circuits shown nor to devices associated with and controlled thereby, as any equivalents of those shown may be used and are comprehended in the scope of the appended claims.

What I claim as new, and desire to secure by Letters Patent, is—

1. In a telegraph system, the combination of means for generating electrical waves; means for modifying such waves in accordance with the signal sent; an aerial receiving-circuit resonant with the transmitted waves; and a wave-responsive device connected to the terminals of an element of the resonant aerial circuit.

2. In a telegraph system, the combination of means for generating electrical waves; means for modifying such waves in accordance with the signal sent; an aerial receiving-circuit resonant with the transmitted waves; and a wave-responsive device connected to the terminals of the inductance of the resonant aerial circuit.

3. In a telegraph system, the combination of an aerial circuit resonant with the transmitted waves; means influenced by the resonant rise of potential across the terminals of the inductance of said resonant circuit; and recording means controlled by said aforementioned means.

4. In a signaling system, the combination of a receiving-conductor, an inductance in series with said conductor and an earth connection, and forming a circuit resonant with the transmitted energy, and a wave-responsive device subjected to the excessive potential at the terminals of said inductance.

5. In a signaling system, the combination of a receiving-circuit resonant with the transmitted energy, a wave-responsive device subjected to the excessive potential difference existing at the terminals of the inductance element of the resonant circuit, and a condenser between the wave-responsive device and said element.

6. In a signaling system, the combination of an aerial receiving-circuit resonant with the transmitted energy, a wave-responsive device subjected to the excessive potential difference at the terminals of the inductance element of the resonant circuit, and a condenser between the wave-responsive device and said element.

7. In a signaling system, a receiving-circuit resonant with the transmitted energy, a wave-responsive device in shunt to the inductance element of said circuit, and condensers between the terminals of said wave-responsive device and the terminals of the inductance element of said resonant circuit.

8. In a signaling system, a plurality of receiving-circuits, each selective of energy of a predetermined frequency, a frequency-determining element common to all the circuits, and a wave-responding device in shunt to each of the remaining elements of the selective circuits.

9. In a signaling system, a plurality of resonant receiving-circuits, an aerial conductor common to all said circuits, and a wave-responsive device in shunt to the inductance element in each resonant circuit.

10. In a signaling system, a plurality of receiving-circuits, each selective of a transmitted energy, a frequency-determining element common to all the circuits, and a wave-responsive device in shunt to a frequency-determining element in each selective circuit, whereby a plurality of independent messages represented by energies of different frequencies may be simultaneously or independently recorded.

CORNELIUS D. EHRET.

Witnesses:
ALICE T. BURROUGH,
EUGENE ZIEGLER.